Dec. 27, 1949     B. A. CHRISTIE     2,492,268
SEAT AND THE LIKE
Filed May 28, 1946     5 Sheets-Sheet 1
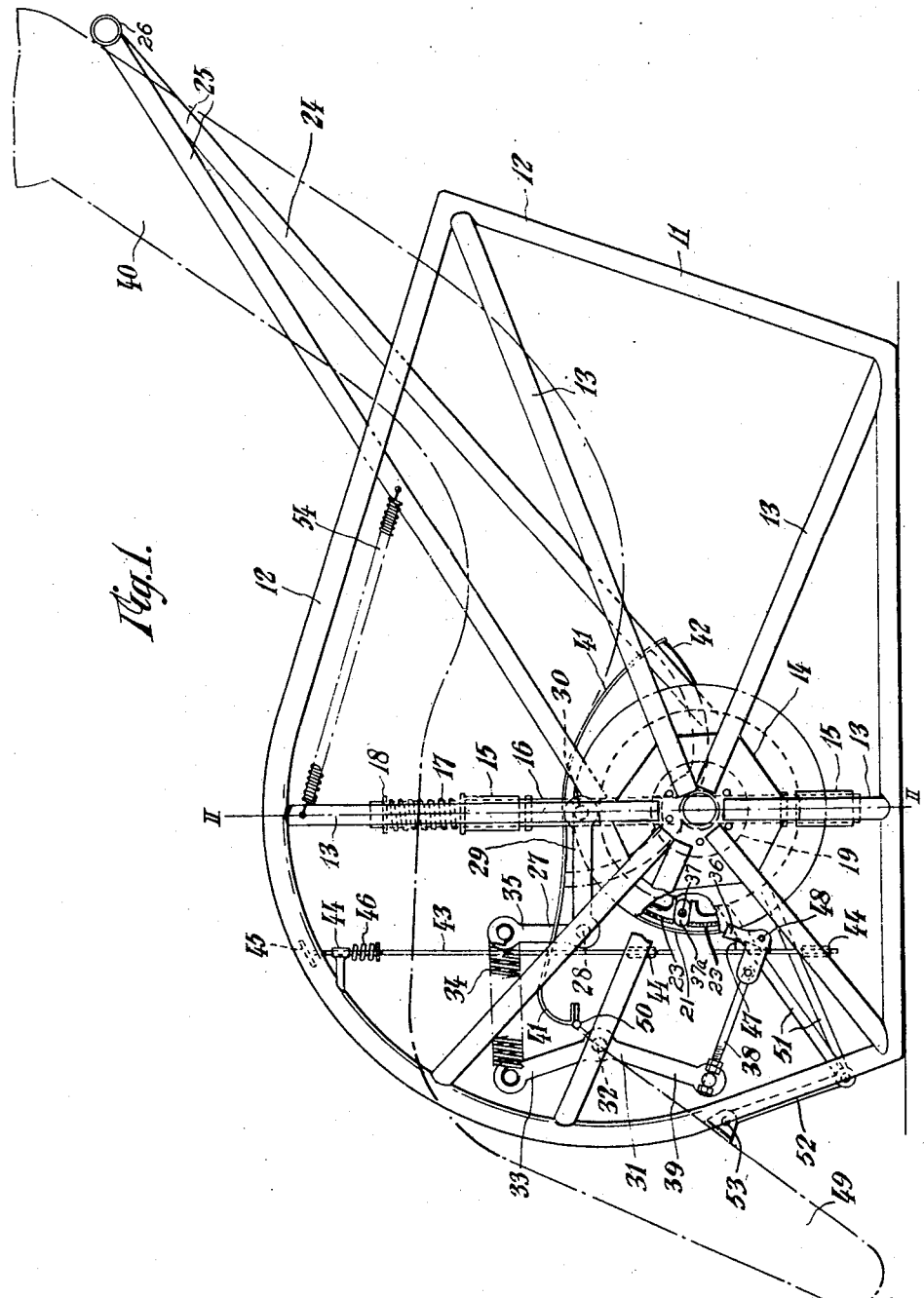
Inventor
BERNARD A. CHRISTIE.
by Pierce + Scheffler attys Dec. 27, 1949  B. A. CHRISTIE  2,492,268
SEAT AND THE LIKE
Filed May 28, 1946  5 Sheets-Sheet 2

Inventor
BERNARD A. CHRISTIE.
by Pierce & Scheffler, attys

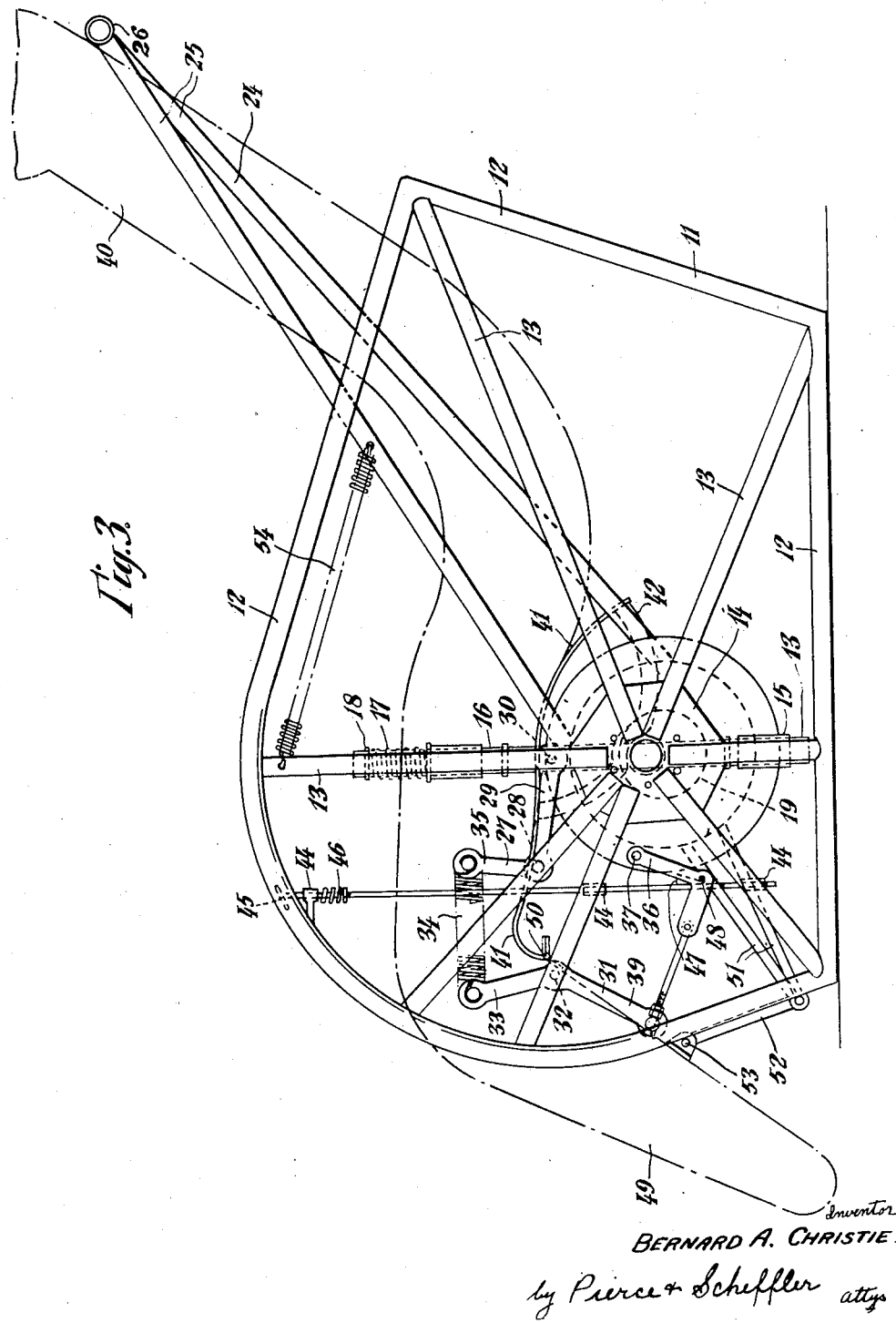

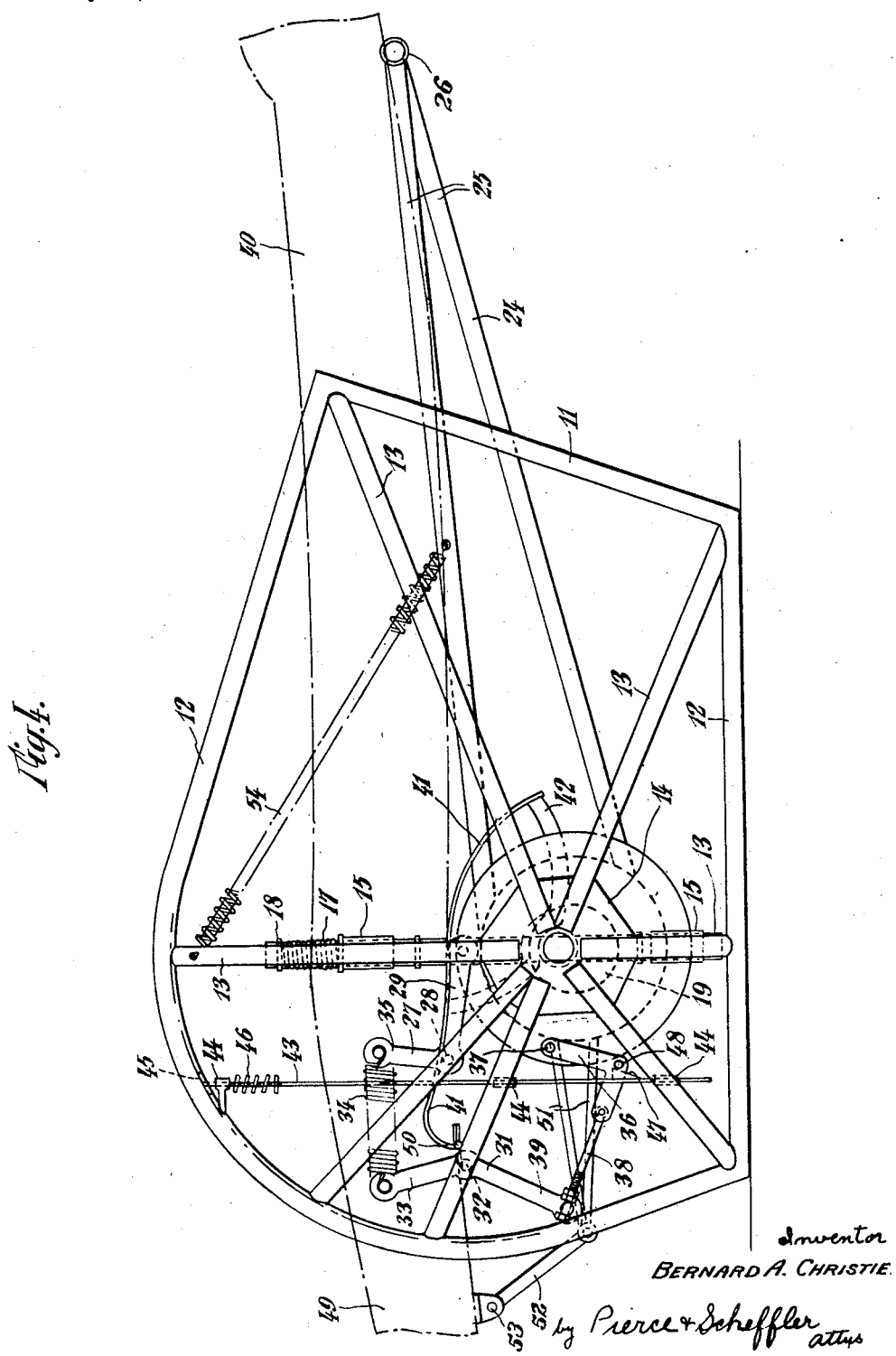

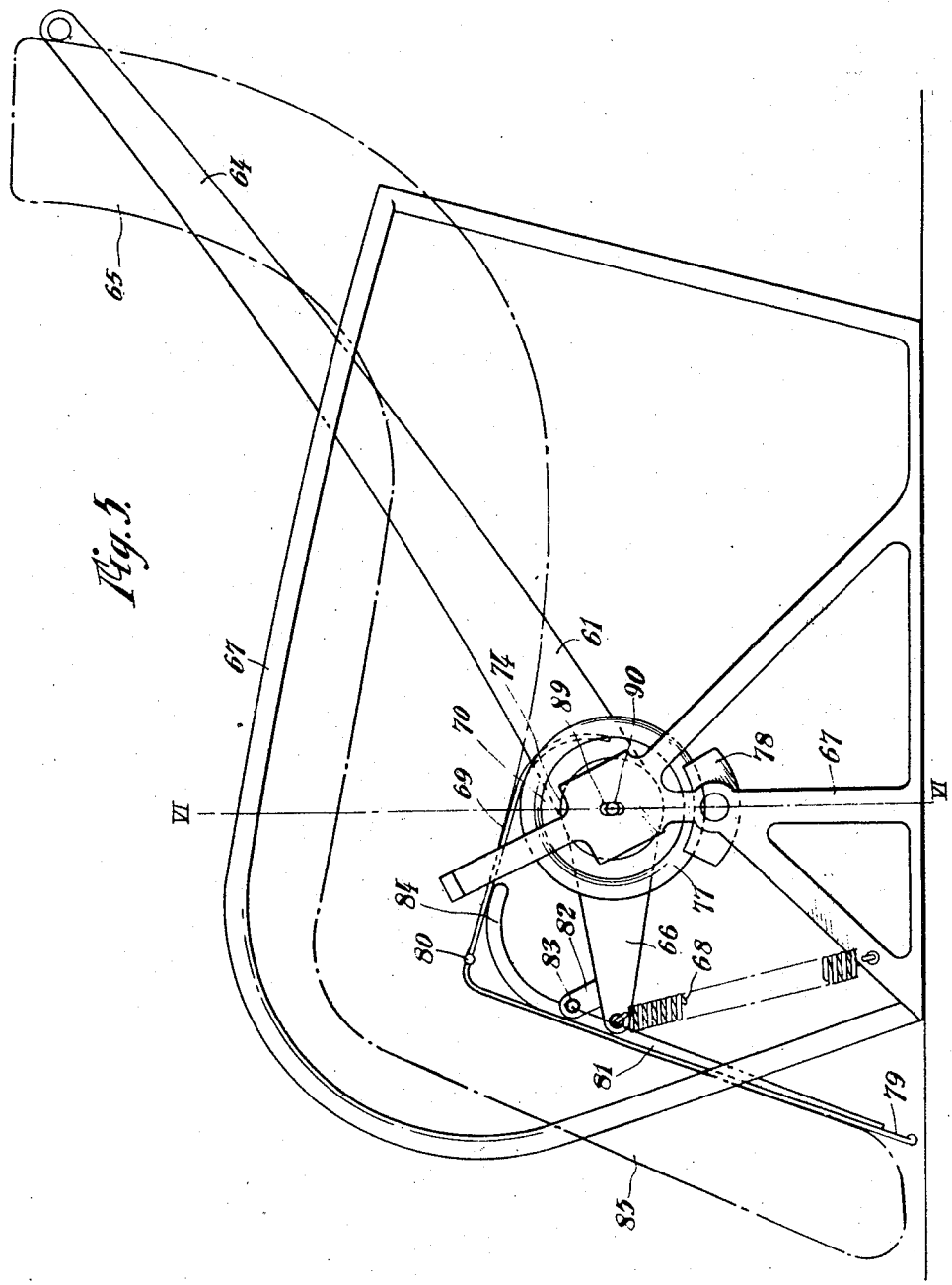

Patented Dec. 27, 1949

2,492,268

UNITED STATES PATENT OFFICE 2,492,268

SEAT AND THE LIKE

Bernard A. Christie, London, England, assignor of one-half to Harris & Tyler Limited, London, England, a British company Application May 28, 1946, Serial No. 672,826
In Great Britain December 15, 1944

Section 1, Public Law 690, August 8, 1946
Patent expires December 15, 1964

6 Claims. (Cl. 155—105)

This invention relates to seats and the like of the type comprising a flexible element slung between front and rear anchorages and providing a combined seat and back rest for support, and is particularly applicable to seats of the type described which also comprise a rigid member of substantial depth from front to rear to which the front anchorage for the flexible element is attached or which constitutes said front anchorage the said member being adapted to provide a rigid support for the flexible element and the upper surface of the said member being arranged substantially as a continuation of the supporting surface of the flexible element.

The invention is of special utility in connection with seats and the like for use on road or rail vehicles, aeroplanes, and ships, but it is also applicable to seats, chairs, sofas, settees and like furniture for domestic or other use.

The object of the invention is to provide improvements in seats or the like of the type described whereby adjustment of the inclination, repose or contour of the seat may be easily attained and whereby the position so attained may be retained.

According to this invention a seat of the type described is provided with a main frame, a subframe pivotally mounted on a horizontal axis disposed transversely of the main frame, the front and rear anchorages of the flexible element being provided by or mounted on said subframe, the axis of the sub-frame being adapted to have vertical relative movement with the main frame, clutch means disposed between said subframe and said main-frame and manually operable to allow relative pivotal movement when desired, and clutch means disposed between said sub-frame and said main-frame adapted for actuation by relative vertical movement of the subframe and main frame. The rigid member providing the forward support and anchorage of the flexible element may be extended forwardly, said extension being supported by a frame member pivotally connected to the front of the sub-frame so as to provide a leg rest.

In the accompanying drawings:

Fig. 1 is a side elevation of the one form of seat according to this invention, upholstery and other irrelevant fittings being removed for convenience of illustration;

Fig. 3 is a similar view to Fig. 1, but showing the sub-frame in a descended position relative to the main frame; and Fig. 4 is a similar view to Fig. 1, but showing the sub-frame angularly displaced relative to the main frame to assume a reclining position.

Fig. 5 is a side elevation of a modified form of seat according to the invention.

Figure 6:
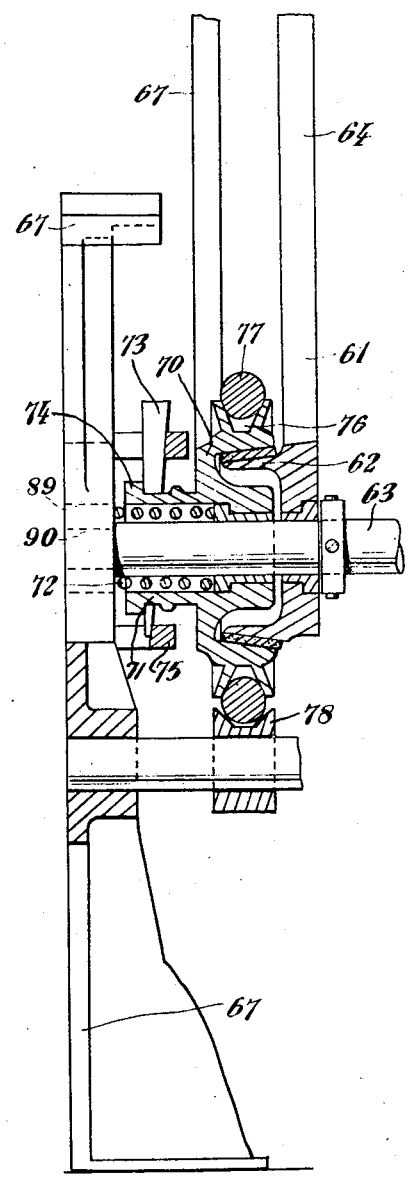
Fig. 6 is a fragmentary side elevation taken on line VI—VI of Fig. 5.
Figure 2:
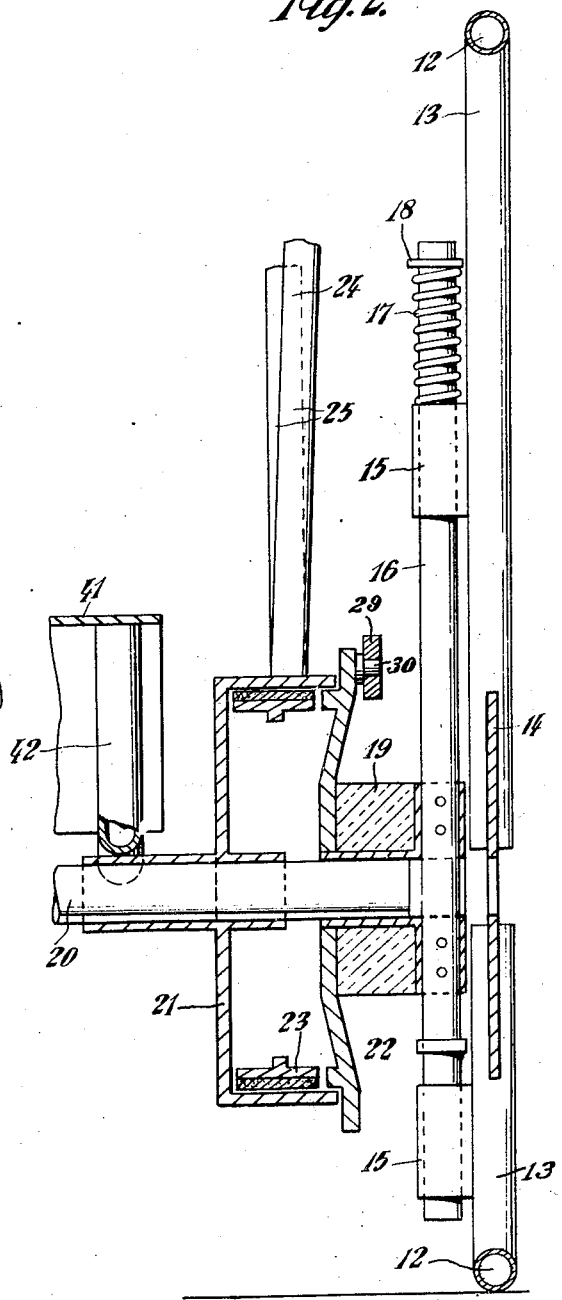
Fig. 2 is a fragmentary transverse sectional elevation taken on line II—II of Fig. 1.

Referring to Figs. 1 to 4, a main frame 11 comprises two sides, only of which is shown in the figures and which are interconnected by suitable transverse rails or other means not shown, formed of tubular contour members 12 and tubular stay members 13, the members 13 being welded at their ends to the contour members 12 and to a medial gusset plate 14. A rigid main frame is provided which is not adapted to have any relative movement with the floor or other surface on which it may be mounted other than, where desired, such movement as is necessary to enable the seat or the like to be moved from one location to another; in some cases the main frame may be secured to the floor or other supporting surface against any relative movement. The sides of the main frame provide foundations for the arms of the seat. On each side of the main frame a pair of sleeves 15 are rigidly mounted, in vertical axial alignment; suitably, the sleeves 15 are welded to two of the tubular stay members 13. A rod 16 is passed through the sleeves 15 and is adapted to slide vertically therein; a helical compression spring 17 surrounds the rod 16 and is disposed between a collar 18 on the rod and an abutment on one of the sleeves 15 so as normally to retain the rod 16 in the elevated position. A bearing block 19 is rigidly mounted on each rod 16, the two said bearings, one on each side of the frame 11, being in horizontal axial alignment so that a transverse horizontal spindle 20 may be rotatively mounted therein. The outer drum member 21 of a circular expanding band clutch is rigidly mounted on the spindle 20, and the inner disc 22 of the clutch, which disc carries the clutch blocks 23, is rigidly mounted on the bearing block 19; there may be one such band clutch at each side of the seat. The sub-frame 24 comprises radial tubular members 25 which are rigidly secured at their inner ends, for example, by welding, to the clutch drum 21, and at their outer ends to a transverse rail 26.

A bell-crank lever 27 is pivotally mounted at 28 on the main frame, and the end of one arm 29 thereof is connected at 30 to the clutch disc 22. A second bell crank lever 31 is pivotally mounted at 32 on the main frame and the end of one arm 33 thereof is connected by a helical tension spring 34 to the end of the other arm 35 of the lever 27. The lever 36 mounted on the spindle 37 which carries a cam 37ᵃ for expanding clutch blocks 23 is connected at its outer end by a connecting rod 38 to the end of the other arm 39 of the lever 31.

In the normal relative positions of the members, that is, with the rods 16, clutch members 21, 22, spindle 20, and the sub-frame 24 raised relatively to the main frame as shown in Fig. 1, the clutch bands 23 are disengaged from the drum 21, and the sub-frame is capable of rotating around the axis of the spindle 20 relatively to the main frame. When the sub-frame is depressed relatively to the main frame, the rod 16 will slide vertically in the sleeves 15 and the clutch members 21, 22 will be depressed simultaneously and vertically with the sub-frame. Depression of the clutch disc 22 will operate the bell-crank lever 27 to pull by means of the spring 34 the bell crank lever 31 and thereby operate the clutch lever 36 to rotate the clutch actuating cam 37ᵃ and expand the clutch bands 23 to cause them to frictionally engage the brake drum 21; in this position, shown in Fig. 3, relative rotation of the sub-frame and main frame is prevented.

The flexible element 40 of the seat is anchored at its upper end to the transverse rail 26 of the sub-frame, and extends downwardly and forwardly to a front anchorage constituted by a rigid member 41 which is of substantial depth from front to rear. The rigid member 41 has its upper surface curved or disposed so that when the seat is in use the said surface is arranged as a continuation of the flexible element 40, for which purpose the flexible element may be carried forwardly over the upper surface of the rigid member right to the front edge of said rigid member and be attached thereto in any suitable manner. The rigid member 41 is rigidly mounted on arcuate stays 42 which are pivotally mounted on a sleeve 21ᵃ carried by the drum member 21 surrounding the spindle 20.

The flexible element 40 may be of canvas, hessian, thin metal sheet, wire gauze, woven wire, or other suitable material, and a seating member such as a cushion or upholstered flexible member of any suitable type is secured to or mounted on the upper surface of said flexible element.

When the seat is initially occupied the weight of the occupant will depress the sub-frame relative to the main frame, and relative pivotal movement therebetween will be prevented as hereinbefore described. If it is afterwards desired, whilst the seat is occupied, to cause the seat to recline, that is, to move from the position shown in Fig. 3 to the position shown in Fig. 4, or to some intermediate position, the clutch members are disengaged by manually operable means to enable the sub-frame to be rotated about the axis of the spindle 20 relatively to the main frame. For this purpose, a vertically disposed rod 43 is mounted and adapted to slide in sleeves 44 rigidly mounted, for example, by welding, on the main frame so that the upper end of the rod, which may be provided with a push plate 45, is disposed near to the upper surface of the side arms of the seat. A helical tension spring 46 surrounds the rod 43 and is anchored at one end to one of the sleeves 44 and at the other end to the rod so that said spring will return the rod upwardly on the release of downward manual pressure applied to the rod at the plate 45. The rod 43 is provided with a wedge-like member 47 rigidly secured thereto which is adapted to co-act with a pin 48 which projects from the outer end of the clutch operating lever 36 so that when the rod 43 is depressed from the position shown in Fig. 3 to the position shown in Fig. 4 the wedge 47 will actuate the lever 36 to release the clutch bands 23 from engagement with the drum 21. The seat may thereupon be reclined by bodily movement of the occupant, and will be locked in any desired position when pressure on the rod 43 is removed and the clutch members are re-engaged. The spring 34 allows movement of the lever 36, on operation by the rod 43, without effecting the position of the lever 27.

The seat is provided with a forwardly and downwardly extending leg rest 49 which is pivotally connected at 50 to the rigid member 41. Stay members 51 are rigidly connected to the clutch drum 21 so as to form, in effect, part of the sub-frame 24, and a connecting rod 52 is pivotally connected at one end to the outer ends of the stay members 51 and at the other end to the underside of the leg rest 49 at 53. The leg rest may thereby rise towards the horizontal position and be supported by the members 51 and 52 when the sub-frame rotates to the reclined position.

When the occupant rises off the seat the sub-frame will rise relatively to the main frame, under the influence of the spring 17 which tends to lift the clutch device. Such rising movement will operate the levers 27 and 31 and allow the clutch members to relax to the declutched positions; the sub-frame may therefore return, under the influence of a spring tension device 54 anchored at its ends to the sub-frame and the main frame, to the normal, substantially upright position of Fig. 1.

In the modified form of seat shown in Figs. 5 and 6 the sub-frame 61 and the inner member 62 of a friction clutch are mounted on the spindle 63, the said clutch member 62 being concentric with the spindle. The arm 64 of the sub-frame projects rearwardly and upwardly from the spindle 63 and provides the rear anchorage for a flexible seat element 65, and another arm 66 of the sub-frame projects forwardly from the spindle 63 and is connected at its forward end to the main frame 67 by a tension spring 68, the spring being adapted to counterbalance the rearwardly overhanging weight of the rear arm of the sub-frame and the load supported thereon. The flexible element 65 is anchored at its rear and upper end to the rear and upper end of the arm 64 of the sub-frame, and extends downwardly and forwardly to a front anchorage constituted by a rigid member 69 which is of substantial depth from front to rear. The rigid member has its upper surface curved or disposed so that when the seat is in use the said surface is arranged as a continuation of the flexible element, for which purpose the flexible element may be carried forwardly over the upper surface of the rigid member right to the front edge of said rigid member and be attached thereto in any suitable manner. The rigid member is rigidly mounted on a quadrant or other suitable member which is pivotally mounted on or around the said spindle.

The outer member 70 of the friction clutch is also mounted on the spindle 63, and is provided with a hollow tubular axial extension or sleeve 71, adapted to surround the spindle 63, a helical compression spring 72 being disposed within said sleeve 71 and around the spindle and be adapted normally to press the said clutch member 70 into frictional contact with the other clutch member 62 on the sub-frame. A tapered member 73, which may be forked to embrace the clutch sleeve 71, passes transversely of said sleeve and spindle between an abutment 74 on said sleeve and an abutment 75 on the main frame whereby when it is moved by operative means transversely of the sleeve and spindle it causes the clutch member 70 to be withdrawn from operative engagement from the other clutch member 62 against the action of the spring 72. The means for operating the tapered member 73 may be a lever, handle, press button or other device mounted on an arm of the seat or otherwise suitably located.

The outer clutch member 70 is provided with a grooved periphery 76 in which is disposed a resilient tyre 77, which may comprise a solid or tubular ring of rubber or other resilient and/or compressible material. The tyre 77 also lies in a grooved member 78 rigidly mounted on the main frame 67 and below the tyre in such a manner that the clutch member 70 and the tyre 77 thereon form one member of a second friction clutch, the rigid grooved member 78 forming the other member of said second clutch, the relative positions of said members of said second clutch being such that when the spindle 63 is in its highest position the clutch members 70, 77 and 78 are out of operative engagement and may rotate relatively to each other, whilst when the spindle is in its lowest position the said clutch members are engaged to prevent relative rotary movement. In order to allow the spindle 63 to move vertically relative to the main frame the ends 90 of the spindle are disposed in vertical slots 89 in the main frame.

When the seat is unoccupied the resilient tyre 77 assumes its normal relaxed condition and presses the sub-frame 64 upwardly in relation to the main frame, the spindle 63 rising to its highest position, and the spring 68 on the forward end of the sub-frame will cause the sub-frame and the seating to rotate and return to their normal position or repose, the tyre 77 sliding angularly in the fixed groove clutch member 78 to allow such rotary movement. When the seat is occupied, the weight of the occupant will press the sub-frame 64 down and the spindle will be depressed to its lowest position; the resilient tyre 77 will be pressed into the rigid grooved member 78 so that it will be frictionally engaged by the said member and the peripheral groove in the other clutch member 70 to prevent relative rotary movement between said members. The sub-frame, together with the seating, is thereby prevented from moving from its normal position of repose. If the occupant wishes to alter the inclination of the seat he presses or operates the device which actuates the tapered member 73 and thereby releases the clutch member 62 and 70 from inter-engagement; the sub-frame together with the seating and the clutch member 62 attached thereto may then be rotated around the axis of the spindle 63 to any position desired by the occupant, merely by said occupant moving forwards or backwards in the seat; when he releases the clutch operating device the sub-frame will be locked against further movement.

The clutches may be of any suitable type; for example, the first clutch may comprise one member attached to the sub-frame and provided with peripheral teeth, the other member being provided by a pawl or movable tooth adapted to be placed into or out of engagement with the peripherally toothed member by means actuated by the occupant of the seat. The second clutch may comprise a tyre which is not resilient, the clutch member to which the tyre is attached being raised out of engagement with the fixed member on the main frame by springs or other resilient devices.

The rigid member 69 providing the front anchorage and support for the flexible element 65 forming the foundation for the seating may be extended forwardly and downwardly, the said extension 79 depending in front of the front edge of the sub-frame; the extension may comprise a metal or wood sheet, curved at its upper end where it is pivotally attached at 80 to the front edge of the said rigid member 69. The said extension 79 rests against a frame member 81 which is pivotally mounted at 83 on a short bracket 82 projecting upwards from the forward arm 66 of the sub-frame 64, the upper end of said frame member 81, above the pivot 83, being curved at 84 to form a rocker or skid adapted to make sliding contact with the underface of the rigid member 69. A cushion 85, providing a leg rest, is attached to the said depending extension member 79. When pressure is applied to the front of the seat by the occupant's thighs, the rigid member 69 will pivot forwardly about the spindle 63 of the sub-frame and the seating will take on a straighter contour to provide a reclining support for the occupant; at the same time, the rigid member 69 will press on the upper curved end 84 of the frame 81 and cause said curved end to slide backwards and the said frame 81 to pivot and so bring the leg support 85 to a more horizontal position thereby bringing the main seating 65 and the leg support 85 nearer to a straight line contour and providing a support on which the occupant may sleep or recline with his body wholly supported.

The means for manually releasing the clutch members from inter-engagement may comprise a Bowden cable device or any other suitable means.

What I claim and desire to secure by Letters Patent is:

1. A seat or the like, of the type described, provided with a main frame, a sub-frame pivotally mounted on a horizontal axis disposed transversely of the main frame, front and rear anchorages of a flexible element being provided on said sub-frame, means for mounting the axis of the sub-frame for vertical relative movement with respect to the main frame, clutch means disposed between said sub-frame and said main frame operable to allow relative pivotal movement between said frames when desired, manual actuating means for said clutch means and automatic actuating means for said clutch means operated by relative vertical movement of the sub-frame and main frame.

2. A seat or the like, according to claim 1, wherein the sub-frame is rigidly mounted on one member of a clutch device, the other member of the clutch device is rigidly mounted on a member adapted for vertical reciprocation in the main frame, the said vertically reciprocating member is provided with resilient means adapted to locate said member in its highest position, a spindle mounted coaxially with said clutch members and carrying said rigid member providing the forward support of the flexible element of the seat, and link mechanism pivotally mounted on the main frame and connected to the said vertically reciprocating member and to the actuating mechanism of said clutch device so as to operate said clutch actuating mechanism on vertical movement of said vertically reciprocating member.

3. A seat or the like, according to claim 1, wherein the sub-frame is rigidly mounted on one member of a clutch device, the other member of the clutch device is rigidly mounted on a member adapted for vertical reciprocation in the main frame, the said vertically reciprocating member is provided with resilient means adapted to locate said member in its highest position, a spindle mounted coaxially with said clutch members and carrying said rigid member providing the forward support of the flexible element of the seat, and link mechanism pivotally mounted on the main frame and connected to the said vertically reciprocating member and to the actuating mechanism of said clutch device so as to operate said clutch actuating mechanism on vertical movement of said vertically reciprocating member, and means are provided for manual operation of the clutch device.

4. A seat or the like, according to claim 1, wherein a spindle is disposed transversely thereof, the ends of the spindle being journalled in vertically elongated bearings on the main frame to enable vertical reciprocation of the spindle, the sub-frame is rigidly mounted on one member of a first clutch device, said first clutch device is mounted coaxially on said spindle, the other member of said first clutch device is an annular member freely rotatable around the axis of said spindle and provided peripherally thereof with a surface constituting one member of a second clutch device, and the other member of said second clutch device is rigidly mounted on the main frame below said first clutch device and provided with a clutching surface in the path of movement of said annular member so that the two members of said second clutch device are engaged on depression of said spindle, a resilient friction medium being disposed between said members of said second clutch device.

5. A seat or the like, according to claim 1, wherein a spindle is disposed transversely thereof, the ends of the spindle being journalled in vertically elongated bearings on the main frame to enable vertical reciprocation of the spindle, the sub-frame is rigidly mounted on one member of a first clutch device, said first clutch device is mounted coaxially on said spindle, the other member of said first clutch device is an annular member freely rotatable around the axis of said spindle and provided peripherally thereof with a surface constituting one member of a second clutch device, and the other member of said second clutch device is rigidly mounted on the main frame below said first clutch device and provided with a clutching surface in the path of movement of said annular member so that the two members of said second clutch device are engaged on depression of said spindle, a resilient friction medium being disposed between said members of said second clutch device, and means are provided for manual operation of the said first clutch device.

6. A seat or the like, according to claim 1, wherein the front anchorage of the flexible element comprises a rigid member providing the forward support and anchorage of the flexible element, a forward extension is provided on said rigid member and said extension is supported by a member pivotally connected to the front of the sub-frame to provide a leg rest.

BERNARD A. CHRISTIE.

REFERENCES CITED

The following references are of record in the file of this patent:

UNITED STATES PATENTS

| Number | Name | Date |
|---|---|---|
| 1,628,764 | Beech | May 17, 1927 |
| 2,133,471 | Opperman | Oct. 18, 1938 |
| 2,361,853 | Lundquist | Oct. 31, 1944 |